(No Model.)
A. F. DURBROW.
SADDLE SUPPORT FOR BICYCLES.
No. 600,686. Patented Mar. 15, 1898.
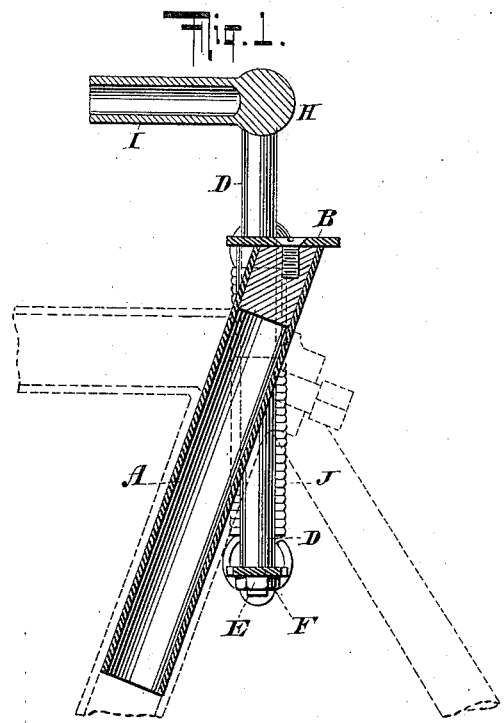
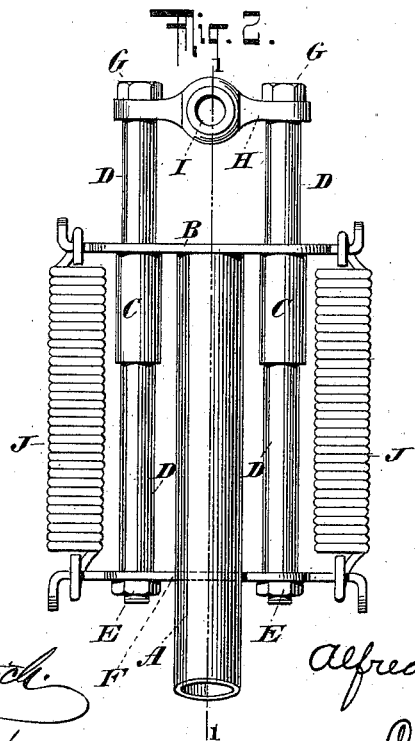
WITNESSES:
Gustave Dieterich
John Schlenbeck
INVENTOR
Alfred F. Durbrow,
BY
Chas. C. Gill
ATTORNEY.

UNITED STATES PATENT OFFICE.

ALFRED F. DURBROW, OF WEST NEW BRIGHTON, NEW YORK.

SADDLE-SUPPORT FOR BICYCLES.

SPECIFICATION forming part of Letters Patent No. 600,686, dated March 15, 1898.

Application filed August 10, 1897. Serial No. 647,677. (No model.)

*To all whom it may concern:*

Be it known that I, ALFRED F. DURBROW, a citizen of the United States, residing at West New Brighton, in the county of Richmond and State of New York, have invented certain new and useful Improvements in Saddle-Supports for Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to improvements in saddle-supports for bicycles and analogous vehicles propelled by the rider; and it consists in the novel structure hereinafter described and claimed.

The object of the invention is to provide an efficient support and one which will under all circumstances relieve the rider from all discomfort and maintain the saddle in its proper alinement with and relation to the bicycle.

The invention will be readily understood from the following description, reference being had to the accompanying drawings, in which—

Figure 1 is a central vertical section of a bicycle-support constructed in accordance with and embodying the invention, the section being on the dotted line 1 1 of Fig. 2, which is a front elevation of same.

In the drawings, A designates the usual saddle-post adapted to the usual bicycle. Upon the post A is secured the transverse horizontal bar B, carrying the depending sleeves C C, within which are arranged the parallel rods D D, to whose lower ends, by means of nuts E E, is secured the transverse horizontal bar F, corresponding to and in alinement with the bar B. The upper ends of the rods D D have secured to them by nuts G G the cross-bar H, to which the saddle-bar I is rigidly affixed.

The outer ends of the upper bar B are connected with the outer ends of the lower bar F by the coiled springs J J, which extend downward when pulled at their lower ends by the bar F during the descent of the latter, due to the weight of the rider upon the saddle.

The cross-bar H, rods D D, and transverse bar F move together as one part, and they, with the saddle and the weight thereon, are supported by the springs J J, which will extend downward as said bar H, rods D, and bar F are driven downward by the weight on the saddle and effectually cushion the latter and relieve the rider of all discomfort from jarring and the like.

With the construction described and claimed the saddle-support is always held in a true position with respect to the wheel, and the saddle is prevented from having any tilting or other disagreeable or unsafe action. The dotted lines in Fig. 1 indicate the relation of the support claimed to the usual bicycle.

What I claim as my invention, and desire to secure by Letters Patent, is—

The saddle-support comprising the post A, and the bar B secured thereon and apertured at opposite sides of said post A, combined with the parallel rods D, D, at opposite sides of said post A and passing through the apertures of said bar B, the bar F connecting the lower ends of said rods D, D, the cross-bar head H connecting the upper ends of said rods D, D, and the springs J, J, connecting the said bars B, F, at opposite sides of said post A; substantially as and for the purposes set forth.

In testimony whereof I affix my signature in presence of two witnesses.

ALFRED F. DURBROW.

Witnesses:
    CHAS. C. GILL,
    EDWIN T. COLLINS.